United States Patent
Riechers et al.

(10) Patent No.: US 10,084,529 B1
(45) Date of Patent: Sep. 25, 2018

(54) SYSTEM AND METHOD FOR AIR-TO-GROUND SINGLE FREQUENCY NETWORKING

(71) Applicant: Rockwell Collins, Inc., Cedar Rapids, IA (US)

(72) Inventors: Carl J. Riechers, Lisbon, IA (US); Ryan J. Coppa, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 15/669,648

(22) Filed: Aug. 4, 2017

(51) Int. Cl.
| | |
|---|---|
| *H04B 7/17* | (2006.01) |
| *H04B 7/185* | (2006.01) |
| *H04L 29/08* | (2006.01) |
| *H04W 84/00* | (2009.01) |
| *H04W 84/06* | (2009.01) |

(52) U.S. Cl.
CPC ......... *H04B 7/18508* (2013.01); *H04L 67/12* (2013.01); *H04W 84/005* (2013.01); *H04W 84/06* (2013.01)

(58) Field of Classification Search
CPC .. H04B 7/18508; H04L 67/12; H04W 84/005; H04W 84/06
See application file for complete search history.

(56) References Cited

U.S. PATENT DOCUMENTS

| | | | | |
|---|---|---|---|---|
| 8,606,266 | B1 * | 12/2013 | Mitchell | ............... H04L 69/321 455/427 |
| 2008/0274734 | A1 * | 11/2008 | Kostanic | ............ H04B 7/18508 455/431 |
| 2017/0311177 | A1 * | 10/2017 | Sarkissian | ............. H04W 16/26 |

OTHER PUBLICATIONS

Verizon, Air: the next frontier for the internet of things, Cision PR Newswire, Oct. 6, 2016, New York, NY, 2 pages.
Wheeler et al., Federal Communications Commission Report FCC 13-157, Dec. 13, 2013, pp. 17132-17182.
Hakan Kavlak et al., PCI Planning Strategies for Long Term Evolution Networks, Networking 2012 Workshops—International IFIP TC 6 Workshops, ETICS, HetsNets, and CompNets, Held at Networking 2012, Prague, Czech Republic, May 25, 2012, pp. 151-156.
Harish Vadada, LTE PCI Planning, www.telecom-cloud.net/up-content/uploads/2010/09/PCI-Planning-for-LTE.pdf, 13 pages.

* cited by examiner

*Primary Examiner* — Lakeram Jangbahdur
(74) *Attorney, Agent, or Firm* — Angel N. Gerdzhikov; Donna P. Suchy; Daniel M. Barbieri

(57) ABSTRACT

A system and related method for minimizing co-channel interference in air-to-ground single-frequency networking includes aircraft-based directional and omnidirectional antenna arrays for transmitting to single frequency networks (SFN) (e.g., LTE, HSPA) and their cell sites. The directional array may encompass several cell sites to take advantage of C-RAN architectures. The system may default to the directional array to establish or re-establish network access, identifying accessible networks and sites and monitoring corresponding synchronization cell counts. The system may minimize co-channel interference with terrestrial network users by switching to the directional array if the count of accessible cell sites or networks becomes high enough, or due to additional factors (e.g., climbing above a threshold altitude). Similarly, the system may switch to the omnidirectional array if the cell count drops below a threshold level.

15 Claims, 5 Drawing Sheets

SYSTEM AND METHOD FOR AIR-TO-GROUND SINGLE FREQUENCY NETWORKING

BACKGROUND

Commercial and business aircraft have so far been unable to utilize next-generation ground-based wireless 3G/4G/5G single frequency networks (e.g., Long Term Evolution (LTE) networks; High Speed Packet Access (HSPA) networks; wideband code-division multiple access (WCDMA) networks) for their passengers due to the risk of co-channel interference. In other words, mobile devices connect to a wireless network through the nearest cell side capable of serving the device. Generally speaking, the number of cell sites available to terrestrial devices will be limited by signal attenuation and obstacles (e.g., terrain, manmade features, curvature of the earth). Unrestricted airborne devices (e.g., carried by passengers) are not subject to said attenuation and obstacles. Therefore, an airborne device with an unobstructed line of sight may "see", and attempt to connect to, numerous terrestrial cell sites, at the risk of significant interference with, and potential disruption of, terrestrial users of these sites and networks. Centralized radio access network (RAN) or cloud-RAN (C-RAN) implementations may mitigate co-channel interference between users to some extent.

SUMMARY

In one aspect, embodiments of the inventive concepts disclosed herein are directed to a system for minimizing co-channel interference for air-to-ground single frequency networking. The system includes at least a directional antenna array and an omnidirectional antenna array installable aboard an aircraft and capable of transmitting to single frequency networks (SFN) (e.g., LTE networks or HSPA networks) and their associated cell sites. The directional antenna array may be selected as the default active option for establishing network connectivity; via the active antenna array or pattern, the system may listen for synchronization and other network signals and thereby identify accessible SFN and their associated network cell sites. The system may monitor the count of accessible networks and network cell sites, and switch the active array between the directional array and the omnidirectional array depending on the current cell count (or due to additional factors, such as the aircraft altitude), transmitting to the accessible SFN and associated cell sites through the currently active array.

In a further aspect, embodiments of the inventive concepts disclosed herein are directed to a method for minimizing co-channel interference for air-to-ground single frequency networking. The method may include receiving, via an aircraft-based active antenna array (which may be either a directional array (the default option) or an omnidirectional array), synchronization signals or other network signals associated with single frequency networks (SFN; e.g., LTE networks, HSPA networks, C-RAN-implemented networks) or their associated network cell sites. The method may include identifying accessible SFN and their associated network cell sites based on the received synchronization or network signals. The method may include determining a current count of the accessible SFN or associated network sites. The method may include selecting the active antenna array, e.g., switching from the directional array to the omnidirectional array or vice versa, based on the current cell count (possibly in combination with additional factors, such as the aircraft altitude). The method may include transmitting to the accessible networks or associated network cell sites via the currently active array.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
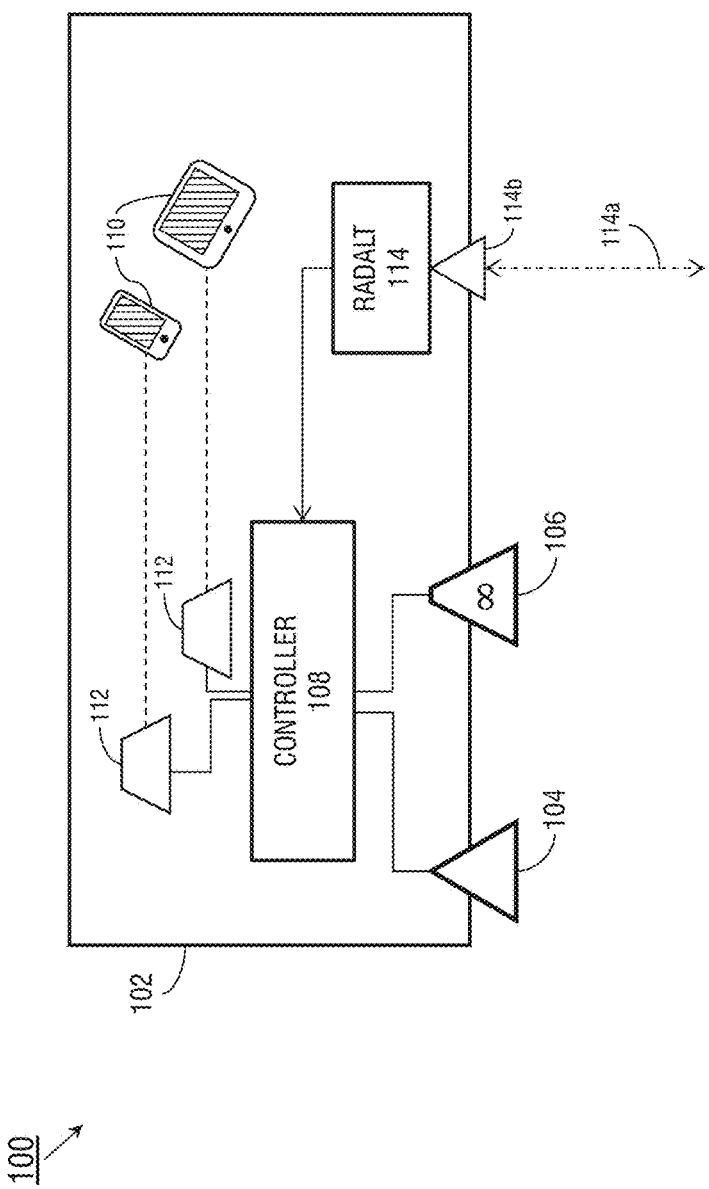
FIG. 1 is a diagrammatic illustration of an exemplary embodiment of a system for minimizing co-channel interference for air-to-ground cellular networking according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and related methods for minimizing co-channel interference for air-to-ground cellular networking. The system allows airborne users (e.g., aircraft passengers) to transmit to ground-based single frequency networks (SFN; including LTE and HSPA networks) and associated network cell sites without causing undue interference for terrestrial users of said SFN by switching between directional and omnidirectional antennas in order to prevent airborne users from transmitting to too many accessible cellular sites at once.

Referring to FIG. 1, an exemplary embodiment of a system 100 for minimizing co-channel interference for air-to-ground cellular single frequency networking aboard an aircraft 102 may include a directional antenna array 104, an omnidirectional antenna array 106, and a controller 108 including one or more control processors. For example, the directional antenna array 104 and omnidirectional antenna array 106 may be switched or routed in a multi-Wide Area Network (WAN) configuration. The directional antenna array 104 may include, for example, one or more antennas or antenna elements (e.g., fixed directional, steerable directional, or variable-beam antennas) inclined downward at a 90-degree angle and configured for a 45 degree half power beam width. The controller 108 may select either the directional antenna array 104 or the omnidirectional antenna array 106 (e.g., one or more omnidirectional antennas or antenna elements) as the "active" array, through which the system 100 may transmit to ground-based single-frequency networks (SFN) via ground-based cell sites (e.g., cell towers). Airborne mobile devices (110) may connect to, and use, these ground-based SFN via WAN wireless routers (112) connected to the controller 108. The system 100 may be compatible with either time-division duplex (TDD) or frequency-division duplex (FDD) single frequency networks. For example, the system 100 may include sufficient steerable directional antenna arrays to support 2×2 multiple-input/multiple-output (MIMO) configurations associated with FDD networks, or lower-cost antennas compatible with TDD networks.

The system 100 may guard against undue co-channel interference, creating no more interference on behalf of airborne mobile devices 110 than for a terrestrial user, based on network signals monitored by the active array. For example, the directional antenna array 104 may be selected as a default option, e.g., upon initial power-up or in the event of a loss of network access, to minimize any loss of synchronization or network connectivity. The system 100 may maintain connectivity with multiple network cell sites by monitoring the synchronized cell counts associated with accessible SFN and associated network cell sites. For a given Evolved Universal Mobile Telecommunications System (UMTS) Terrestrial Radio Access (EUTRA) absolute radio frequency channel number (EARFCN) or network provider (as indicated by mobile country codes (MCC) or mobile network codes (MNC)) the system 100 may select an active antenna array or pattern based on synchronized cell counts. For example, the active array may listen for network signals broadcast by network cell sites, including both synchronization signals from which the controller 108 may identify a particular network cell or associated SFN, and beacon signals not strong enough to resolve. If the count of identified cells increases above an ideal range, the controller 108 may select the directional antenna array 104 as the active array in order to prevent the system 100 from accessing too many cells, restricting the amount of co-channel interference to that of a terrestrial user. Threshold cell counts may be set externally by network providers (e.g., to limit co-channel interference) or by the system 100. For example, some next-generation C-RAN networks may be able to add 30 dB of fade margin improvement to user signals by reassembling data streams from more than one network cell site, improving or eliminating entirely the hand-off delay between network cell sites; accordingly, the optimal cell count may be three or four (depending on other considerations such as cell size or density). Accordingly, while terrestrial network users may normally "see" between one and sixteen network cell sites; three or four active cells may be optimal for air-to-ground transmission. Similarly, the controller 108 may select the omnidirectional antenna array 106 as the active array when the cell count is lower, or drops below a predetermined lower-bound threshold, to increase access to active cells. For example, with respect to C-RAN implementations, the lower bound may be set to two active cells in order to maximize fade margin and take full advantage of C-RAN load balancing across multiple network cell sites. Antenna selection events may be timed, and the switching of antenna arrays or patterns may be sequenced, such that maintaining network access may be balanced with minimizing the number of necessary selection events.

The system 100 may determine cell counts based on a variety of identifiable SFN and associated network signals, e.g., a physical cell identifier (PCI) counts based on identified LTE/4G network cells, or a primary scrambling code (PSC) count based on identified 3G/HSPA/3.5G/WCDMA network cells. With respect to LTE networks, the active array may listen for both primary synchronization signals (PSS) and secondary synchronization signals (SSS) transmitted by network cell sites. By processing the received PSS and SSS, the controller 108 may identify and log each accessible network cell site or the associated SFN. Each PSS includes one of three possible physical layer identities, and each SSS includes one of 168 possible physical layer cell identity groups, for a total of 504 possible physical-layer cell identities (PCI), each PCI corresponding to a network cell site. Similarly, HSPA/WCDMA networks may be associated with 512 possible synchronization sequences, or primary scrambling codes (PSC); assuming proper planning, each network cell site will correspond to a distinct PSC. It should be noted that careful network planning, or the assignment of PCI/PSC to ground-based network cell sites, should avoid suboptimal or duplicate sequence or code assignments to adjacent network cell sites, as sequence/code reuse may complicate the ability of the system 100 to identify distinct network cell sites.

The PCI count monitored by the controller 108 may vary according to cell size or altitude. For example, areas of dense population may also be associated with more, and smaller, network cells, and correspondingly a denser overlay of more network cell sites. The controller 108 may be connected to an aircraft altimeter, such that the controller may consider the current altitude of the aircraft 102 in selecting either the directional antenna array 104 or the omnidirectional antenna array 106 as the active array. In some embodiments, the system 100 may include a radio altimeter (114) configured to determine the altitude of the aircraft by timing the return rate of a radio signal (114a) transmitted toward the ground. The radio altimeter 114 may include a dedicated antenna element (114b), or may be configured to use the directional antenna array 104 for signal transmission and reception. The controller 108 may select the active array based on a weighted combination of the altitude data and PCI count. For example, in more densely populated areas the distribution of network cell sites may be correspondingly denser, and the cell size correspondingly smaller. The system 100 may, when the aircraft is positioned over such densely populated areas or based on other special considerations, select the directional antenna array 104 as the active array at a lower altitude than the normal upper-bound threshold altitude (if, for example, the PCI count regularly reaches the upper-bound threshold at an altitude under the threshold altitude). Similarly, network cell sizes may vary with cellular frequency bands, such that lower-frequency cells may be larger than higher-frequency cells. Accordingly, threshold altitudes may vary based on different frequency bands.

In some embodiments, the omnidirectional antenna array 106 may be a steerable variable beam width combination antenna array configured to switch between omnidirectional antenna emission patterns and directional emission patterns (e.g., emulating the directional antenna array 104). For example, if the aircraft 102 reaches the upper-bound altitude or the PCI count reaches the upper-bound threshold, the controller 108 may switch from an omnidirectional emission pattern to a directional emission pattern; if the aircraft drops below the lower-bound altitude or the PCI count falls below the lower-bound threshold, the controller may switch from the directional pattern to the omnidirectional pattern.

Figure 2:
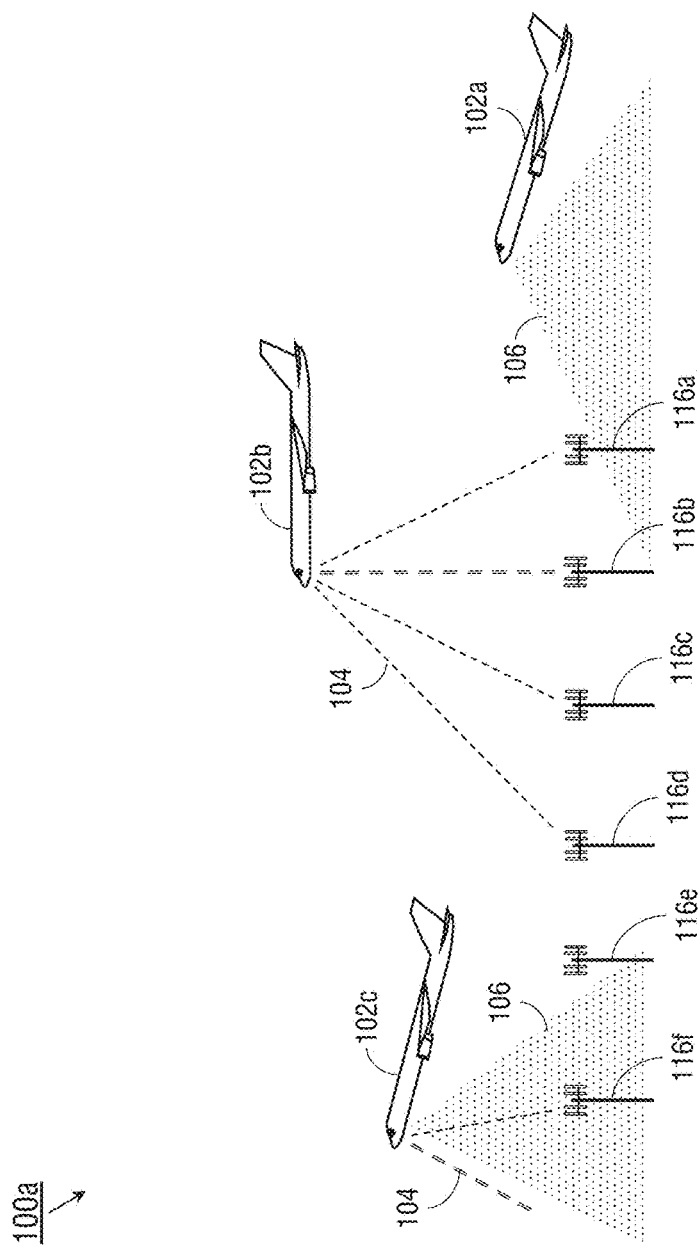
FIG. 2 is a diagrammatic illustration of operations of the system of FIG. 1.

Referring to FIG. 2, the system 100a may be implemented and may be identical to the system 100 of FIG. 1, except that the system 100a may select either the directional antenna array 104 or the omnidirectional antenna array 106 as the active array based on PCI count, based on the altitude of the aircraft 102a-b, or via a weighted combination of the two, and transmit to network cell sites 116a-f (or their associated SFN) via the active array. The system 100a may take into consideration any number of additional characteristics in determining when to switch between the directional array 104 and the omnidirectional antenna array 106, e.g., based on the signal strength or link quality from either array, the absolute or relative position of the aircraft, or other weighted factors. For example, at lower altitudes the connectivity of the aircraft (102a) to network cell sites 116c-f may be blocked by signal attenuation, or by natural and manmade obstacles in the line of sight between the aircraft 102a and the more distant network cell sites 116c-d. Accordingly, lower altitudes may correlate with a lower overall PCI count; therefore at lower altitudes the system 100a may select the omnidirectional antenna array 106 as the active array, thereby connecting to the accessible network cell sites 116a-b. The system 100a may base its selection on either a comparatively low altitude of the aircraft 102a (which may be beneath a predetermined lower-bound altitude threshold), on a low PCI count (which may be beneath a predetermined lower-bound PCI count threshold), or on a weighted combination of the two. Similarly, at higher altitudes the aircraft (102b) may have a clear line of sight to every network cell site 116a-d in its vicinity. Accordingly, the system 100a may, when the aircraft 102b reaches a predetermined upper-bound altitude or when the PCI count of accessible network cell sites 116a-d reaches a predetermined upper-bound count (or based on a weighted combination of these factors), select the directional antenna array 104 as the active array, thereby listening more narrowly for, and connecting to, accessible network cell sites 116a-d. The aircraft (102c) may return to a lower altitude, at which point the PCI count may correspondingly decrement as the aircraft 102c maintains a line of sight to a diminishing number of network cell sites 116a-f. Should the aircraft 102c drop below the lower-bound altitude threshold, or its PCI count drop below the lower-bound PCI threshold (e.g., the PCI count drops to one), the system 100a may deselect the directional antenna 104 and select the omnidirectional antenna array 106 as the active array, thereby connecting to the accessible network cell site 116f.

Figure 3:
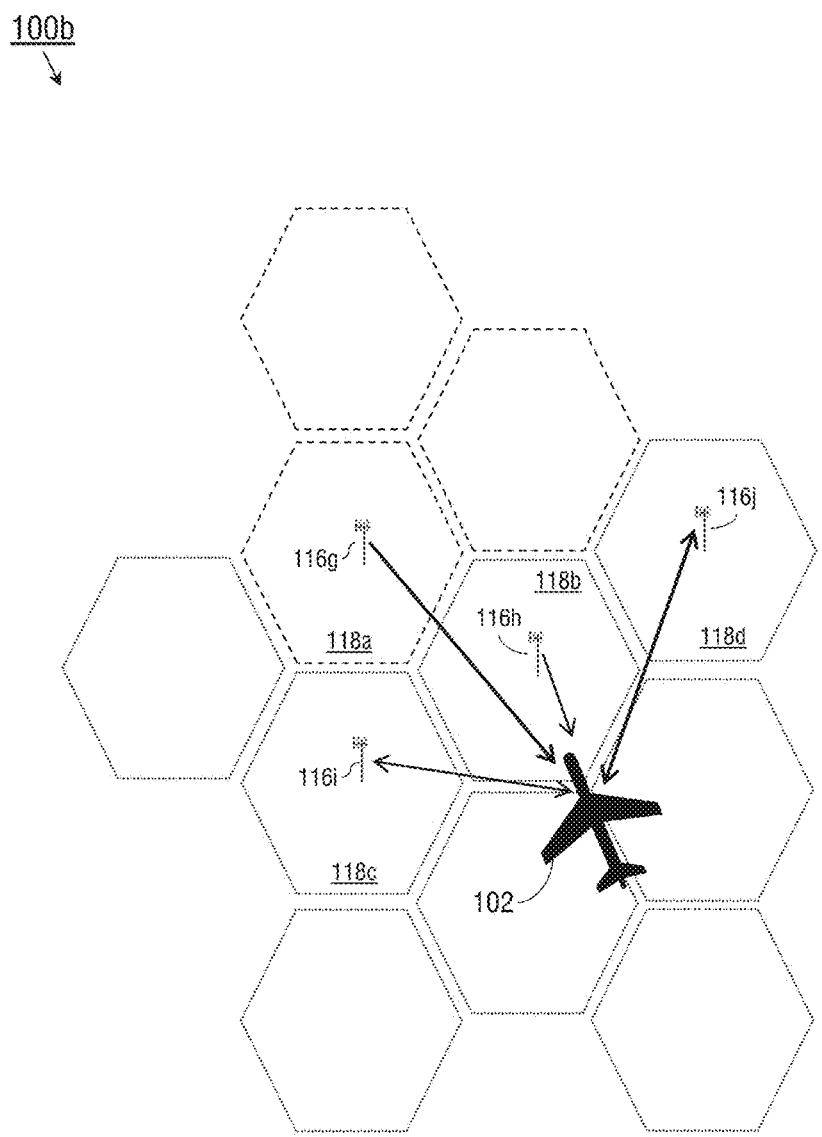
FIG. 3 is a diagrammatic illustration of operations of the system of FIG. 1.

Referring now to FIG. 3, the system 100b may be implemented and may function similarly to the system 100a of FIG. 2, except that the system 100b may account for mobile country codes (MCC), mobile network codes (MNC), and/or bidirectional link quality in its selection of an active array or active antenna pattern. For example, the system 100b aboard the aircraft 102 may receive synchronization signals from network cell sites 116g-h in network cells 118a and 118b, which may be located in different countries or may be served by different providers. The system 100b may weight the active-array selection toward the directional antenna array (104, FIG. 1) in order to prioritize the network cell site 116h over the network cell site 116g and prevent undue co-channel interference with the provider serving the network cell 118a. In some embodiments, both types of antenna array of the system 100b may perform within PCI count criteria. For example, the PCI count may be neither too high to select the directional antenna array 104 based on count threshold, nor too low to select the omnidirectional antenna array (106, FIG. 1) based on count threshold. The system 100b may determine a bidirectional link quality of the connections to the network cell sites 116i-j (in network cells 118c-d) and select as the active array (or active pattern) the array or pattern providing the higher link margin.

Figure 4A:
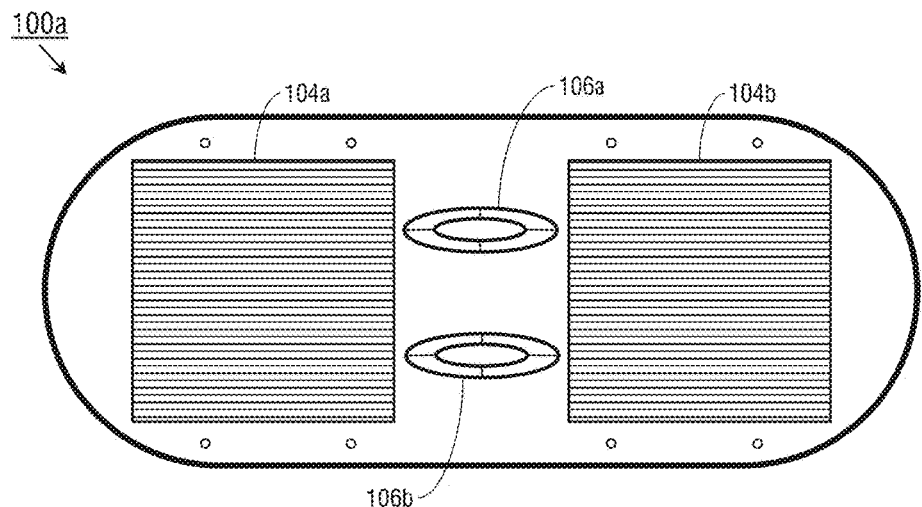
FIGS. 4A through 4C illustrate the system of FIG. 1.
Figure 4B:
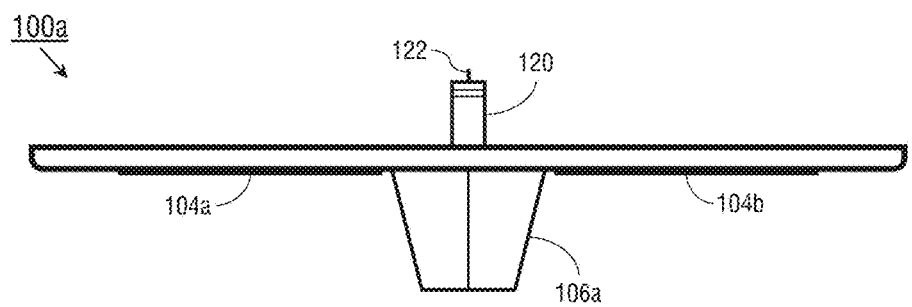
Figure 4C:
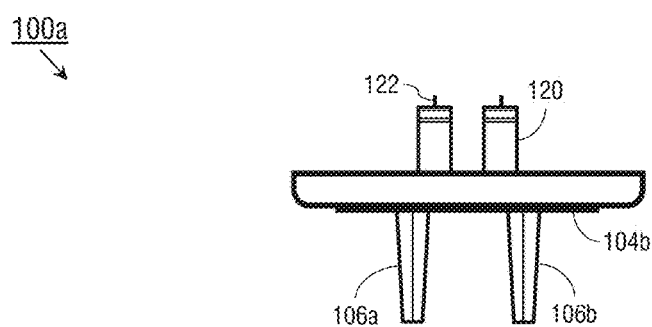

Referring now to FIGS. 4A through 4C, the composite antenna 100a may be implemented and may function similarly to the system 100 of FIG. 1, except that the composite antenna 100a may be installable to the aircraft 102 (as shown by FIG. 4A in an underside view, by FIG. 4B in a side view, and by FIG. 4C in a forward view) by coaxial connectors 120. By way of a non-limiting example, the composite antenna 100a may include two orthogonal broadband directional antenna arrays 104a-b and two omnidirectional antenna arrays 106a-b. The composite antenna 100a may include two internal switches (not shown) capable of selecting as the active array either the directional antenna arrays 104a-b or the omnidirectional antenna arrays 106a-b, e.g., via a DC voltage on the center conductors 122 of the coaxial connectors 120. The composite antenna 100a may select the directional antenna arrays 104a-b as the active arrays as a zero-voltage default, switching to the omnidirectional antenna arrays 106a-b based on the determined cell count (or due to other additional factors) as described above.

Figure 5:
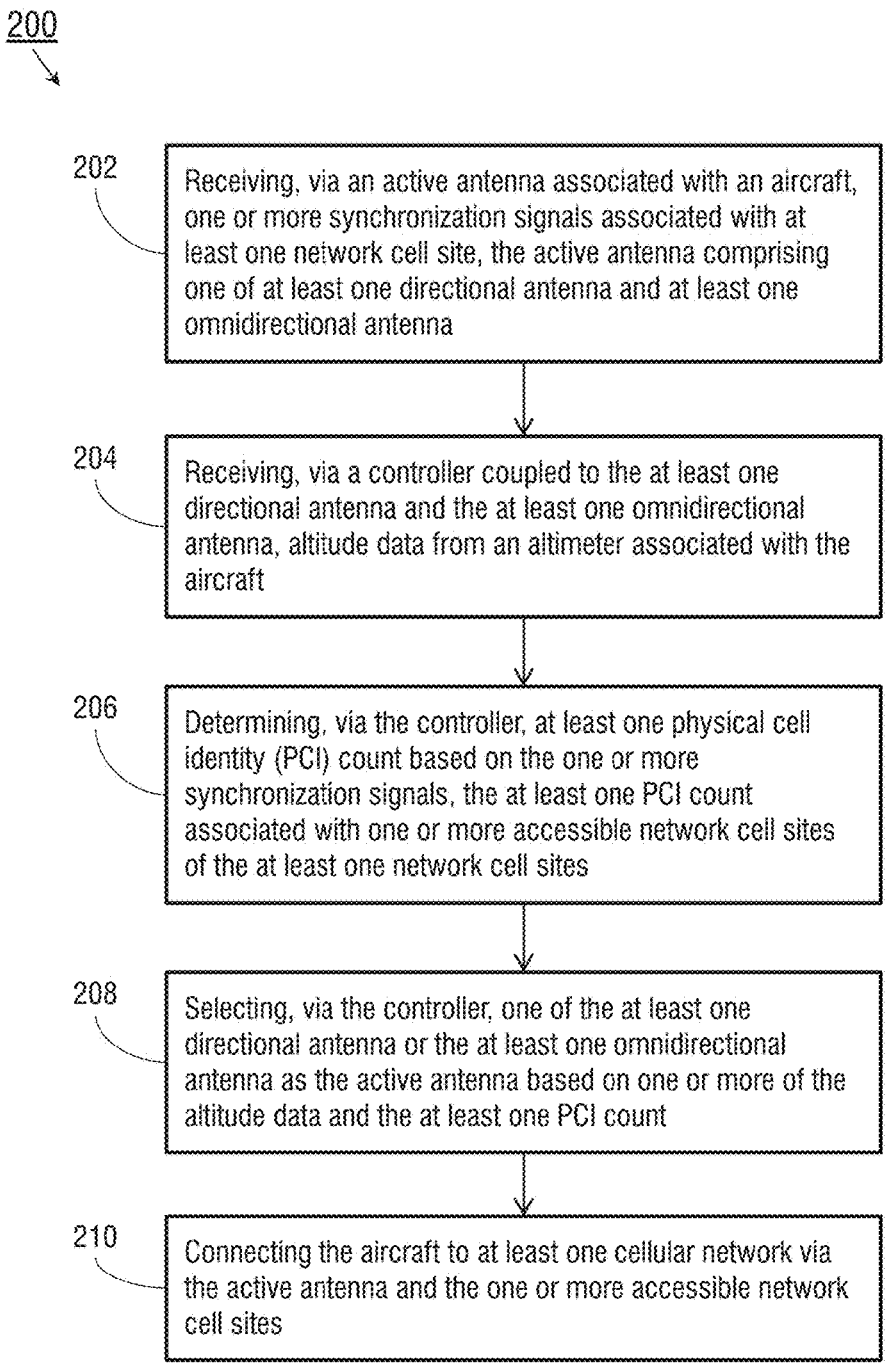
FIG. 5 illustrates an exemplary embodiment of a method according to the inventive concepts disclosed herein.

Referring now to FIG. 5, an exemplary embodiment of a method 200 for minimizing co-channel interference for air-to-ground single frequency networking according to the inventive concepts disclosed herein may be implemented by the system 100 in some embodiments, and may include one or more of the following steps. At a step 202, the active array (either the directional antenna array/pattern or the omnidirectional antenna array/pattern) receives one or more network signals associated with at least one network cell site. For example, the active array may receive synchronization signals associated with SFN networks (e.g., primary and secondary synchronization signals (PSS, SSS) associated with LTE networks or other network signals associated with HSPA or other SFN networks) as well as signals unresolvable into identifiable sites or networks.

At a step 204, the controller identifies accessible SFN, or accessible network cell sites associated with identifiable SFN, based on the received network signals.

At a step 206, the controller determines a cell count of accessible SFN and/or accessible network cell sites based on the received network signals. For example, the cell count may include one of more of a PCI count of accessible LTE networks or network cell sites, or a PSC count of accessible HSPA networks of network cell sites.

At a step 210, the controller selects the directional array or pattern or the omnidirectional array or pattern as the active antenna array or pattern, based on the determined cell count. For example, the controller may, in selecting the directional or omnidirectional array as the active array, deselect the alternative antenna array. If the omnidirectional array is currently active, the controller may select the directional array or pattern when the cell count exceeds a predetermined upper-bound or threshold count; similarly, if the directional array is currently active, the controller may select the omnidirectional array or pattern when the cell count deceeds (e.g., drops below) a predetermined lower-bound threshold count. The controller may select either the directional array/pattern or the omnidirectional array/pattern based on identified mobile network codes (MNC) or mobile country codes (MCC) associated with a particular SFN or network provider. The controller may select either the directional array/pattern or the omnidirectional array/pattern as the active array/pattern by determining the bidirectional link quality of a connection via the directional array and a connection via the omnidirectional array, and selecting as the active array/pattern the array/pattern providing a higher bidirectional link quality.

At a step 212, the controller transmits to the identified SFN or associated network cell sites via the currently active array or pattern.

The method 200 may include an additional method step 208. At the step 208, the controller receives altitude data from a radio altimeter or other altitude source aboard the aircraft. Accordingly, the controller may select either the directional antenna array/pattern or the omnidirectional antenna array/pattern based on the received altitude data in combination with the determined cell count. For example, if the omnidirectional array/pattern is the active array, the directional array/pattern may be selected based on the altitude (or cell count) exceeding a predetermined threshold altitude or threshold cell count. Similarly, if the directional array/pattern is currently active, the omnidirectional array/pattern may be selected based on the altitude or cell count deceeding a predetermined threshold.

As will be appreciated from the above, systems and methods according to embodiments of the inventive concepts disclosed herein may provide airborne connectivity with ground-based single frequency networks without causing undue co-channel interference with the terrestrial users of said networks. By selecting the appropriate antenna array or pattern for connecting with ground-based network cell sites, the system prevents airborne mobile devices from transmitting when there are too many accessible network cell sites, thereby preventing excessive co-channel interference.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. A system for air-to-ground single frequency networking, comprising:

at least one antenna array configured for installation aboard an aircraft, the antenna array including at least one omnidirectional antenna element and at least one directional antenna element and configured to transmit to at least one of:

a single frequency network (SFN), the SFN including one or more of a Long Term Evolution (LTE) network, a High Speed Packet Access (HSPA) network, and a network associated with at least one Cloud-Radio Access Network (RAN) or Centralized-RAN (C-RAN) architecture; and a network cell site associated with the SFN via an active antenna corresponding to one of the at least one omnidirectional antenna element or the at least one directional antenna element;

at least one controller coupled to the antenna array, the at least one controller including at least one control processor configured to:

identify, based on one or more of a received network signal and a received synchronization signal, at least one of the SFN and the network cell site;

determine at least one cell count based on the identified SFNs and the identified network cell sites, the cell count including at least one of a primary scrambling code (PSC) count and a physical cell identifier (PCI) count;

select as the active antenna the at least one directional antenna element based at least on the determined cell count exceeding a first upper bound; and select as the active antenna the at least one omnidirectional antenna element based at least on the determined cell count deceeding a first lower bound.

2. The system for air-to-ground single frequency networking of claim 1, wherein:

selecting as the active antenna the at least one directional antenna includes deselecting the at least one omnidirectional antenna;
and
selecting as the active antenna the at least one omnidirectional antenna includes deselecting the at least one directional antenna.

3. The system for air-to-ground single frequency networking of claim 1, wherein the at least one control processor is configured to select as the active antenna one of the at least one directional antenna and the at least one omnidirectional antenna based on at least one of a mobile network code (MNC) and a mobile country code (MCC) associated with at least one of the SFN and the network cell site.

4. The system for air-to-ground single frequency networking of claim 1, wherein the at least one control processor is configured to:
determine one or more of a first bidirectional link quality associated with the at least one directional antenna and a second bidirectional link quality associated with the at least one omnidirectional antenna;
and
select as the active antenna one of the at least one directional antenna and the at least one omnidirectional antenna based on one or more of the first bidirectional link quality and the second bidirectional link quality.

5. The system for air-to-ground single frequency networking of claim 1, further comprising:
at least one radio altimeter coupled to the controller, the radio altimeter configured to provide the controller with altitude data associated with the aircraft.

6. The system for air-to-ground single frequency networking of claim 5, wherein the at least one control processor is configured to select as the active antenna one of the at least one omnidirectional antenna element and the at least one directional antenna element based on one of more of the altitude data and the determined cell count.

7. The system for air-to-ground single frequency networking of claim 5, wherein:
the at least one control processor is configured to select as the active antenna the at least one directional antenna based on the altitude data exceeding a second upper bound; and
the at least one control processor is configured to select as the active antenna the at least one omnidirectional antenna based on the altitude data deceeding a second lower bound.

8. A method for minimizing co-channel interference for air-to-ground single frequency networking, the method comprising:
receiving, via an active antenna associated with an aircraft, one or more network signals associated with at least one of a single frequency network (SFN), the SFN including at least one of a Long Term Evolution (LTE) network, a High Speed Packet Access (HSPA) network, and a network associated with at least one Cloud-Radio Access Network (RAN) or Centralized-RAN architecture, and a network cell site associated with the SFN, the active antenna comprising one of at least one directional antenna and at least one omnidirectional antenna;
identifying, via a controller coupled to the at least one directional antenna and the at least one omnidirectional antenna, at least one of the SFN and the associated network cell site based on the one or more received network signals;
determining, via the controller, at least one cell count based on the one or more received network signals, the at least one cell count associated with at least one of the identified SFN and the identified network cell site and including at least one of a primary scrambling code (PSC) count and a physical cell identifier (PCI) count;
selecting, via the controller, one of the at least one directional antenna or the at least one omnidirectional antenna as the active antenna based at least on the at least one cell count either exceeding a first upper bound or deceeding a first lower bound;
and
transmitting to at least one of the identified SFN and the identified network cell site via the active antenna.

9. The method of claim 8, wherein selecting, via the controller, one of the at least one directional antenna or the at least one omnidirectional antenna as the active antenna based at least on the at least one cell count either exceeding a first upper bound or deceeding a first lower bound includes:
selecting the at least one directional antenna as the active antenna and deselecting the at least one omnidirectional antenna; and
selecting the at least one omnidirectional antenna as the active antenna and deselecting the at least one directional antenna.

10. The method of claim 8, wherein selecting, via the controller, one of the at least one directional antenna or the at least one omnidirectional antenna as the active antenna based at least on the at least one cell count either exceeding a first upper bound or deceeding a first lower bound includes:
selecting the at least one directional antenna as the active antenna based on the at least one cell count exceeding a first upper bound;
and
selecting the at least one omnidirectional antenna as the active antenna based on the at least one cell count deceeding a first lower bound.

11. The method of claim 8, wherein selecting, via the controller, one of the at least one directional antenna or the at least one omnidirectional antenna as the active antenna based at least on the at least one cell count either exceeding a first timer bound or deceeding a first lower bound includes:
selecting, via the controller, one of the at least one directional antenna or the at least one omnidirectional antenna as the active antenna based on at least one of a mobile network code (MNC) and a mobile country code (MCC), the MNC and the MCC associated with at least one of the identified SFN and the identified associated network cell site.

12. The method of claim 8, wherein selecting, via the controller, one of the at least one directional antenna or the at least one omnidirectional antenna as the active antenna based at least on the at least one cell count either exceeding a first upper bound or deceeding a first lower bound includes:
determining, via the controller, one or more of a first bidirectional link quality associated with the at least one directional antenna and a second bidirectional link quality associated with the at least one omnidirectional antenna;
and
selecting as the active antenna one of the at least one directional antenna and the at least one omnidirectional antenna based on one or more of the first bidirectional link quality and the second bidirectional link quality.

13. The method of claim 8, further comprising:
receiving, via the controller, altitude data from at least one radio altimeter associated with the aircraft.

14. The method of claim 13, wherein selecting, via the controller, one of the at least one directional antenna or the at least one omnidirectional antenna as the active antenna based at least on the at least one cell count either exceeding a first upper bound or deceeding a first lower bound includes:
   selecting, via the controller, one of the at least one directional antenna or the at least one omnidirectional antenna as the active antenna based on one or more of the at least one cell count and the altitude data.

15. The method of claim 14, wherein selecting, via the controller, one of the at least one directional antenna or the at least one omnidirectional antenna as the active antenna based on one or more of the at least one cell count and the altitude data includes:
   selecting the at least one directional antenna as the active antenna based on one or more of a) the at least one cell count exceeding a first upper bound and b) the altitude data exceeding a second upper bound;
   and
   selecting the at least one omnidirectional antenna as the active antenna based on one or more of b) the at least one cell count deceeding a first lower bound and b) the altitude data deceeding a second lower bound.

* * * * *